United States Patent [19]

Garcia de Leon

[11] Patent Number: 4,702,760
[45] Date of Patent: Oct. 27, 1987

[54] METHOD FOR STRENGTHENING GLASS ARTICLES THROUGH ELECTROSTATIC IONIC INTERCHANGE

[75] Inventor: José L. Garcia de Leon, Nuevo Leon, Mexico

[73] Assignee: Vitro-Tec Fideicomiso, Monterrey, Mexico

[21] Appl. No.: 787,601

[22] Filed: Oct. 15, 1985

[30] Foreign Application Priority Data

Oct. 16, 1984 [MX] Mexico .................................. 203061

[51] Int. Cl.$^4$ ............................................. C03C 21/00
[52] U.S. Cl. .................................... 65/30.14; 427/27; 427/33
[58] Field of Search ................... 427/27, 33; 65/30.13, 65/30.14

[56] References Cited

U.S. PATENT DOCUMENTS 3,791,809  2/1974  Lau ...................................... 65/30.14
4,230,068  10/1980  Itoh et al. .......................... 427/27 X
4,377,603  3/1983  Itoh et al. .......................... 427/27 X Primary Examiner—Robert L. Lindsay
Attorney, Agent, or Firm—Abelman Frayne Rezac & Schwab

[57] ABSTRACT

In a process for the manufacture of glass articles, mainly glass bottles, said glass articles are strengthened by an ion exchange method, which involves exchanging alkali metal ions from the surface of said glass articles by other alkali metal ions provided by an ion exchange medium applied to the surface of said glass articles, which provides a strengthening layer in the surface of said glass articles. This ion exchange method is greatly improved by supporting said glass articles on a grounded metallic conveyor; charging electrostatically an ion exchange medium; and spraying a flow of said electrostatically charged ion exchange medium on said glass articles, in the line of production before the stage of article thermal treating. This promotes a uniform application of the ion exchange medium in the surface of said articles.

3 Claims, 2 Drawing Figures

METHOD FOR STRENGTHENING GLASS ARTICLES THROUGH ELECTROSTATIC IONIC INTERCHANGE

FIELD OF THE INVENTION

The present invention is related to the chemical treatment of glass articles in order to improve their mechanical strength, and particularly to the treatment of glass containers at the production line. The treatment is provided by the method of generating a compression coating through electrostatic ionic interchange. This electrostatic ionic interchange provides a greater mechanical strength, a greater resistance to mechanical shock and a greater resistance to internal pressure.

BACKGROUND OF THE INVENTION

Some of the principal goals that are sought through the increase of mechanical strength of the glass container are the following: provide greater handling safety for the manufacturer, the bottler and the user, as well as to permit the reduction of the weight of the containers (less glass quantity) especially with those containers known as "non-returnable" which need to be lighter and more resistant.

Glass traditionally has been considered to be a fragile material inspite of the theoretical calculations concerning its resistance. If we take into account that the aforementioned resistance is based on the forces that are necessary to break its atomic ties then glass does show high values of mechanical strength.

The discrepancy between the ideal strength and the one that is observed in practice is generally due to the presence of defects or imperfections on the glass surface which act as points where forces are concentrated.

These superficial defects can be generated from the time that the glass is smelted and prepared during the forming process or from the time that the glass article or specifically the glass container comes out of the forming machine until the moment that, for some reason, the container is discarded.

The condition under which the glass is naturally very strong is in the forces of pure compression.

The glass, naturally weak to tension forces can be strengthened if the surface that is subjected to tension is previously treated in such a way that residual compression forces remain after treatment. The resistance is increased in a magnitude that is equal to the forces of compression that are generated.

There exist several methods to pre-strengthen the surface of glass articles such as physical tempering, glass casing and chemical treatment, which is the one that has to do with the method of the present invention.

Under the term "Chemical Treatment" are grouped phenomena of ionic interchange both at temperature that are above as well as below the glass smelting deformation point.

I IONIC INTERCHANGE AT LOW TEMPERATURES. It is called thus because this ionic interchange has to take place at a temperature that is under the one at which glass can liberate forces. Normally this temperature is below the point where forces begin to generate due to cooling (the Strain Point), although in exceptional circumstances the interchange can take place a little above that temperature. With this method, ions that are relatively large, such as potassium or sodium, migrate to the inside of the glass in order to interchange smaller ions of sodium or lithium from the glass composition of the soda-calcium composition. Compression forces do develop at the interchange coating area due to the differential of ionic dimensions with the resulting physical inlay at the coating area. Since the temperature of the glass is less than the temperature at which these effects can take place the forces are retained to strengthen the glass.

This method is capable of developing high compression forces and consequently a high degree of strengthening of the article takes place.

The problems that have been encountered in order to apply this technology at an industrial level are the following:

Apply the treatment in a shorter time thus maintaining the reliability of the process.

Prevent the appearance of undesirable secondary effects on the container such as a chemical attack which has a result opaque or tranished glass surfaces.

Make the article to be resistant after treatment inspite of the fact that the glass article was damaged before it was treated.

In order to overcome these problems several application methods of the ionic interchange media have been proposed.

Weber and others, in their U.S. Pat. No. 3,218,220, suggested the immersion of the article in a mixture of smelted salts (which therefore, has to be effected outside of the production line) while the article is at an ionic interchange temperature, as well as the use of an electrolyte. However, this method is difficult to put into practice because up to now the problem of how to prevent thermic shock at the time the potassium salts are applied to the hot bottles has not been resolved. This problem is discussed in pages 339 and 340 of the article entitled "Methods of Influencing Glass Container Strength" published by D. G. Osborne in the September issue of the 1982 "Glass" magazine.

The application of the salts in an aqueous solution is easier to implement. However, if they are applied when the article is near its deformation point glass cracks are generated and some salts undergo hydrolysis which produce compounds that attack the container.

The application of the salts in a powder form prevents the problems of cracks and hydrolisis but this method produces inefficiency with respect to the quality of ionic interchange. This is so because there is not good adherence of the powder salts to the article.

The salts have also been applied in an aqueous solution or dissolved in an organic liquid at low temperatures as is suggested by Grubb and others in their U.S. Pat. No. 3,844,754.

The solution can be sprayed on the container at moderately high temperatures so that one or more of the liquid components are evaporated and a solid film on the glass surface is formed. Later the glass article is heated to a treating temperature.

Levene in his U.S. Pat. Nos. 3,853,673 and 3,853,674 proposes the formation of a gel coating at a high temperature where the gel contains the salts or salts used for the ionic interchange.

Watanabe in his U.S. Pat. Nos. 4,021,218 and 4,206,253 emphasizes the use of a high temperature decomposition surfactant that also has an excellent miscibility with the potassium salts used. He applies an aqueous solution to the article at room temperature while the solution is from 30° to 75° C. hotter. As a result a coating of potassium salts is obtained on the glass surface.

The problem presented with these methods resides in that since they are all carried out at low temperatures they have to be applied out of the production line. In other words, when the containers have a temperature which is different from that of the production line - previously and/or after the salt application-it is necessary to subject the glass articles to a new thermic treatment in order to obtain the desired ionic interchange and the strengthening of the containers. Consequently this represents a method that takes longer and is not very economic.

II. IONIC INTERCHANGE AT HIGH TEMPERATURES. The development of this technique for hardening glass articles was accidental. This happend when at the annealing lehrs the combustion gases contained $SO_2$ in quantities that permitted the reaction with the alkali on the surface of the glass to produce $Na_2SO_4$. The articles came out of the lehr with a white coating which was removed by washing. The surface coating, having a different composition, had a minor coefficient of expansion, which gave upon cooling residual compression forces.

Another procedure is described by Hood and others in their U.S. Pat. No. 2,779,136 wherein a glass that contains interchangeable potassium and/or sodium ions is treated at a temperature that is higher than the point where forces begin to generate due to cooling (the Strain Point) with a lithium ion source. For example, a smelted lithium salt. The lithium ions migrate to the inside of the glass in order to interchange ions of sodium or potassium. The interchanged coating suffers a molecular rearrangement in order to accomodate the small lithium ions and forms a glass coating with a lesser expansion coefficient than the one of the original glass. When the article cools compression forces develop in the new glass coating due to the expansion coefficient differences.

In the U.S. Pat. No. 2,075,466 ions of copper or silver are replaced by sodium ions.

The objective of this process is the formation of a glass coating with a different composition than the one of the original glass and with a minor expansion coefficient.

The results are similar to these obtained with a physical tempering when the interchange is optimum, except when a crystalline stage appears on the glass surface. However, with a physical tempering, which is practically impossible to achieve with bottles because of their irregular shapes it can be achieved in minutes with the method proposed. This different form the ionic interchange physical tempering of the process which can take up to several hours to be complete.

Another treatment which offers the possibility of application in the production line is the one claimed by the U.S. Pat. No. 3,791,809 of law. This patent describes a method used to strengthen glass articles through the use of ionic interchange between sodium and potassium. This is done by applying pulverized salts of potassium nitrate and tripotassium phosphate to the glass when they are still hot. The result is that one of the salts fuses over the article in order to retain the salt of ionic interchange and the articles are heated thereafter at high temperatures in order to carry out the ionic interchange reaction. Lastly the glass artcile is cooled gradually to room temperature.

The said procedure, even though it has the advantage of being able to apply it at the production line, it has disadvantage of requiring a previous and/or thermic treatment in order to obtain fusion of the salts on the article and a relatively uniform ionic interchange on the glass surface.

Searching to solve the problems of the previous methods mentioned above, the inventor of the present invention found that in order to obtain shorter treatment times and maintain the reliablity of the method it was necessary that the same be applied at some place on the production line. It was also found that in order to avoid undersirably secondary effects the treatment had to be made in such a way that it would not leave traces or visible coatings of compounds that would take away the brillance from the containers. Also in order to make the containers resistant after the treatment, inspite of having been damaged previously, the method used must be of such a type that the results had to be integrated within the containers and not only as a mere coating that, when lost, the resistance would also be lost. The results had to guarantee the uniformity of forces on the glass surface with greater safety that would be obtained with a simple previous or posterior heat treatment.

Thus the inventor of the present invention was able to obtain the method that will strengthen glass articles through an ionic interchange so that the strengthening treatment is in fact intimately integrated with the article in an electrostatic form. This makes easier the application and the obtainal of the ionic interchange and consequently the uniformity of the forces generated on the surface of the glass and the reliability of the method is guaranteed. The method described includes then the use of spraying a flux of ionic interchange powders electrostatically charged onto the glass articles at the temperature that they have after having been formed and before entering the annealing lehr (or gradual cooling). In other words, at the production line, so that the treatment could be carried out within the same production times without there beging any additional delays for the treatment. Thus all of the problems presented previously by others methods were solved.

SUMMARY OF THE INVENTION

Therefore, the principal object of the present invention is the one of providing a method for strengthening glass articles through the use of electrostatic ionic interchange at the production line and at the speed of manufacturing. This was achieved by spraying powdered electrostatically charged ionic interchange salts onto the articles at the temperature that they have after being formed and before the gradual cooling stage.

Likewise a principal object of the present invention is the one of providing a method for strengthening glass articles, of the afore mentioned nature, that has a high degree of reliability and that permits that the treatment be made at the speed of production. This is so because the treatment is provided at the production line without the need of additional treatment times to achieve the desired strengthening.

Additionally, another principal object of the present invention is the one of providing a method for strengthening glass articles, of the previously described nature, in such a way that the treatment is intimately integrated to the articles and to the present manufacturing process avoiding secondary effects and chemical attack on the articles caused by additional thermic treatments as well as avoiding superficial coatings of compounds that provide as a result opaque or tarnished surfaces.

Another principal object of the present invention is the one of providing a method for strengthening glass articles, of the kind previously described, which permits a uniform strengthening of the articles maintaining their resistance after treatment inspite of the fact that the articles were damaged previously. This is so because the treatment is uniformly and intimately integrated within the articles and not as mere superficial coatings that were adhered to the same.

Another principal object of the present invention is to provide a method to strengthening glass articles, of the type previously mentioned, through which it is possible to facilitate the lessening of the weight of the articles because they are more resistant after treatment, and consequently the glass consumption, fuels, forming time, etc. are reduced.

These and other objects and advantages of the present invention will become evident to the experts in the field once they read the following detailed description of the invention that is provided for purposes of clarity.

DETAILED DESCRIPTION OF THE INVENTION

Now follows a description of the invention that make reference to the specific modality of the invention illustrated in attached drawings which include the numbers that make reference to the same parts of the drawings.

Figure 1:
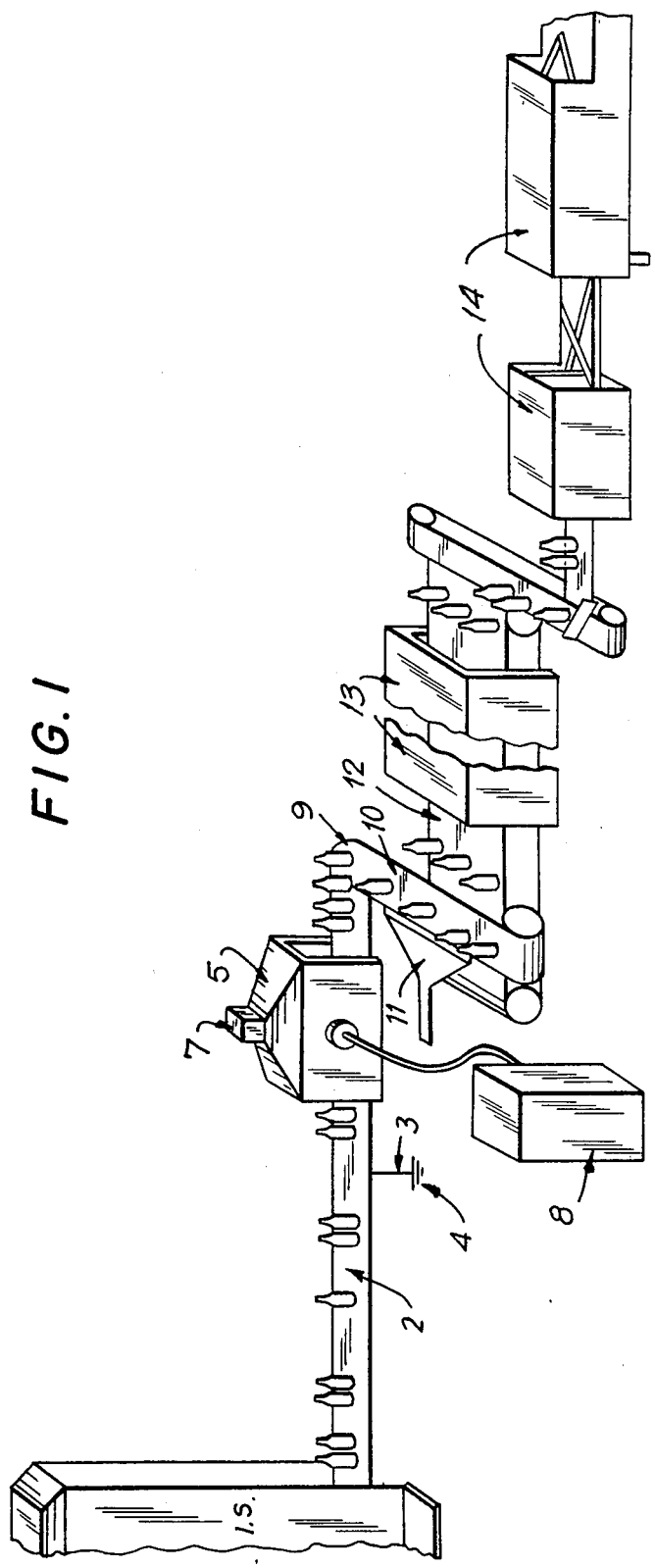
Figure 2:
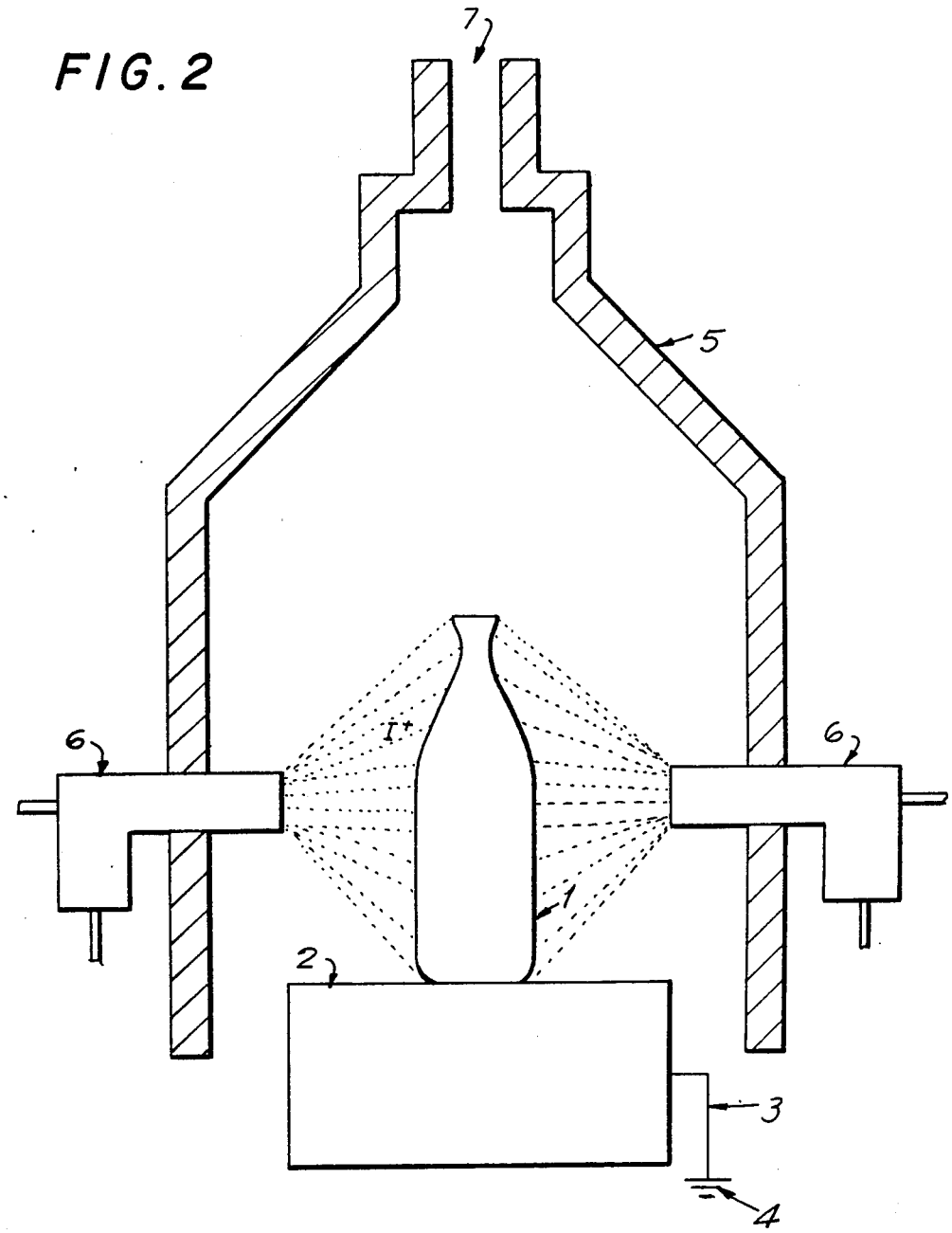

FIG. 1 is a diagram of the location and treatment equipment used on the glass articles at the line of production through the use of a method for strengthening glass articles that includes electrostatic ionic interchange of the present invention; and FIG. 2 is a detailed view of the means that are used so that the method of the present invention can be carried out.

Making reference to the drawing now follow, firstly, a description of the glass articles production line which shows the treatment equipment used. This equipment uses the method to strengthen glass articles by means of electrostatic ionic interchange, of the present invention.

Glass articles and more specifically glass containers 1 come out still hot from the glass forming machine such as the one known as I.S. (Individual Section Machine) on top of a transporting metallic belt 2 which through the use of a metallic line 3 of some highly conducting metal such as cooper is grounded 4. The said transporting belt 2 is elongated for a relatively short span so that it is made to pass through a tunnel made out of insulating material 5 and which includes a number of spraying nozzles 6 (Drawing 2) which spray the electrostatic ionic interchange powders I into a mist within the tunnel 5 on all of the surface of the containers 1 and including a powder stack 7 which discharges and recuperates the excess powders. The nozzles 6 are connected to an electrostatic application equipment 8 which charge the powders of electrostatic ionic interchange.

Tunnel 5 can include as many nozzles as is necessary, preferably of the Automatic SRV-86 Powder Sprayer type, such as is manufactured by the Sames Company. Likewise, and adequate electrostatic powder application equipment 8 is one that is produce by De Vibiss with 90 KV to electrostatically charge the powder particles.

The powder ionic interchange depends on the ion that is included in the composition of the container and it can have a alkaline metal salt such as potassium chloride, that is if the containers include a sodium ion in their composition. The containers can also include a mixture of salts or compounds of alkaline metal. A potassium nitrate and a potassium chlorate mixture of 1:1 is recommended and the powder particles can have an appropriate screen Mesh size of 325 ASTM.

The containers 1 that come out of the tunnel 5 follow the trajectory and posterior conventional treatment that are very well known and which consist of changing the trajectory of the containers 1 through the use of an apparatus called a transfer 9 towards a transversal belt 10 so that the containers are placed in rows which through the use of a pusher apparatus 11 they are transferred to a lineal belt 12 into a tempering lehr 13 in order to gradually cool the aforementioned containers 1.

In order to eliminate the excess powders on the surface of the container the use of a conventional washing and drying equipment 14 is recommended, such as the one that is manufactured by Abamex, S.A. This equipment is placed at the exit of the tempering lehr 13 and the lineal trajectory of the containers is replaced if the latter is adequate.

Thus with the powder application equipment and located at production line described above, the method for strengthening glass articles through the use of electrostatic ionic interchange of the present invention can be carried out as per the following discription:

1. Grounding the metallic transporting belt 2 in such a way that the glass articles 1 are themselves grounded;
2. Loading of the electrostatic application equipment 8 with ionic interchange powders such as the following potassium salts: $K_3PO_4$, $K_2HPO_4$, $K_2SO_4$, $KNO_2$, $K_2F_2$, $KI$, $KCL$; the same to be used separately or as a mixture;
3. Loading of the particles of the powdered salts 1 with a high voltage, such as 90 KV;
4. The application to the glass articles, at the production line, immediately after the forming stage, of an ionic interchange powder spray through the use of an electrostatic application equipment 8, through the spraying nozzles 6, within the treating tunnel 5;
5. Elimination of the ionic interchange residual powders from the surface of the articles, through washing, after its gradual cooling stage; and
6. Drying and packing of the articles.

Based on this method tests were performed at the "Vidriera Los Reyes, S.A." plant. The result of this tests follow in order to put into practice this invention.

EXAMPLE

A mixture of ionic interchange salts consisting of 5 Kilograms of Potassium Chloride (KCL) and 5 Kilograms of Potassium Nitrate ($KNO_3$) was prepared by dissolving it in 10 liters of water. The temperature of the mixture was gradually increased accompanied by vigorous stirring until a complete dissolution of the salts was obtained; the solution then was evaporated until dry and the remaining powdered mixture was grounded. The resulting ground powdered mixture passed through a 60 ASTM Mesh and 50% passed through a 200 ASTM Mesh; finally 1-2% of dehydrated corn desxtrine was added.

This powder was loaded into the De Vil Biss electrostatic charging equipment which installed at the number 24 production line. A compressor was needed here to maintain a pressure of 5 Kilograms/$cm^2$.

Disposable 215 gram/325 milliliter amber soda lime glass containers of typical composition were selected for the test. An estimate was made according to a standard deviation of (S=40) which a lot of normal production presents so that the minumum number of sample turned out to be N=125. This number coincides with the number of samples that the consumer checks and decides upon from a lot of 5,000 articles.

The first containers were let through without applying any treatment and the same served as untreated test samples that could be compared with the treated ones, presupposing their normal behaviour. The salt spraying application was made on the rest of the containers 1 and reading of temperature compared with time in the annealing lehr were taken with a travelling three channel thermopar.

Some random samples were collected and taken to the Quality Control Laboratory where they tested with the following results

| TESTS | RESULTS OF TESTS PERFORMED ON AMBAR SODA LIME GLASS BOTTLES OF 215 grams, 325 milliliters | | | | |
|---|---|---|---|---|---|
| | AVERAGE RUPTURE PRESSURE (Lbs./Square Inch) | STANDARD DEVIATION | MINIMUM (Lbs./Square Inch) | MAXIMUM (Lbs./Square Inch) | NUMBER OF SAMPLES |
| 1 | 184 | 30 | 110 | 250 | 126* |
| 2 | 306 | 56 | 110 | 450 | 191** |

*NORMAL BOTTLE
**BOTTLE TREATED WITH SALTS IS EASILY CLEANED.

An important difference was obtained with the tests. It was shown that the resistance to internal pressure was increased by an average of 66.3%. These results provide the opportunity to apply the aforementioned treatment with reliability and without having to make important modifications to the production line.

Finally it must be clear that the invention does not limit itself exclusively to the above presented description and that experts in the field can, with the teaching provided by this invention, make modifications to the process which will clearly be undertending to be within the scope of the invention which is making the following:

I claim:

1. A method of strengthening glass articles on a production line through the use of electrostatis ionic interchange comprising:
   (a) supporting said glass articles on a grounded metallic transportation belt;
   (b) electrostatically charging an ion exchange medium comprising a powdered alkali metal salt or mixture of alkali metal salts wherein the alkali metal ions have a size greater than the alkali metal ions on the surface of the glass articles;
   (c) spraying a flow of said electrostatically charged powdered alkali metal ions on the surface of said glass articles passing on said grounded metallic transportation belt in the line of production before the thermal treating stage in order to exchange the smaller alkali metal ions from the surface of said glass articles by the larger alkali metal ions provided by said electrostatically charged alkali metal powder; thus
   (d) promoting a uniform application of said ion exchange medium on the surface of said glass articles to provide a uniform strengthening layer on the surface of said glass articles.

2. A method of strengthening glass articles through the use of electrostatic ionic interchange as defined in claim 1, wherein the ionic interchange powders are electrostatically charged through the use of high voltage.

3. A method of strengthening glass articles through electrostatic ionic interchange as defined in claim 1, wherein the ionic interchange salts are selected among phosphates, diphosphates, sulphates, nitrites, nitrates, flourates, iodates or chlorides of alkaline metals, or a mixture of the same.

* * * * *